April 10, 1962 K. L. HACKLEY 3,029,153
METHOD OF TREATING CALCIUM CARBONATE
Filed March 4, 1959
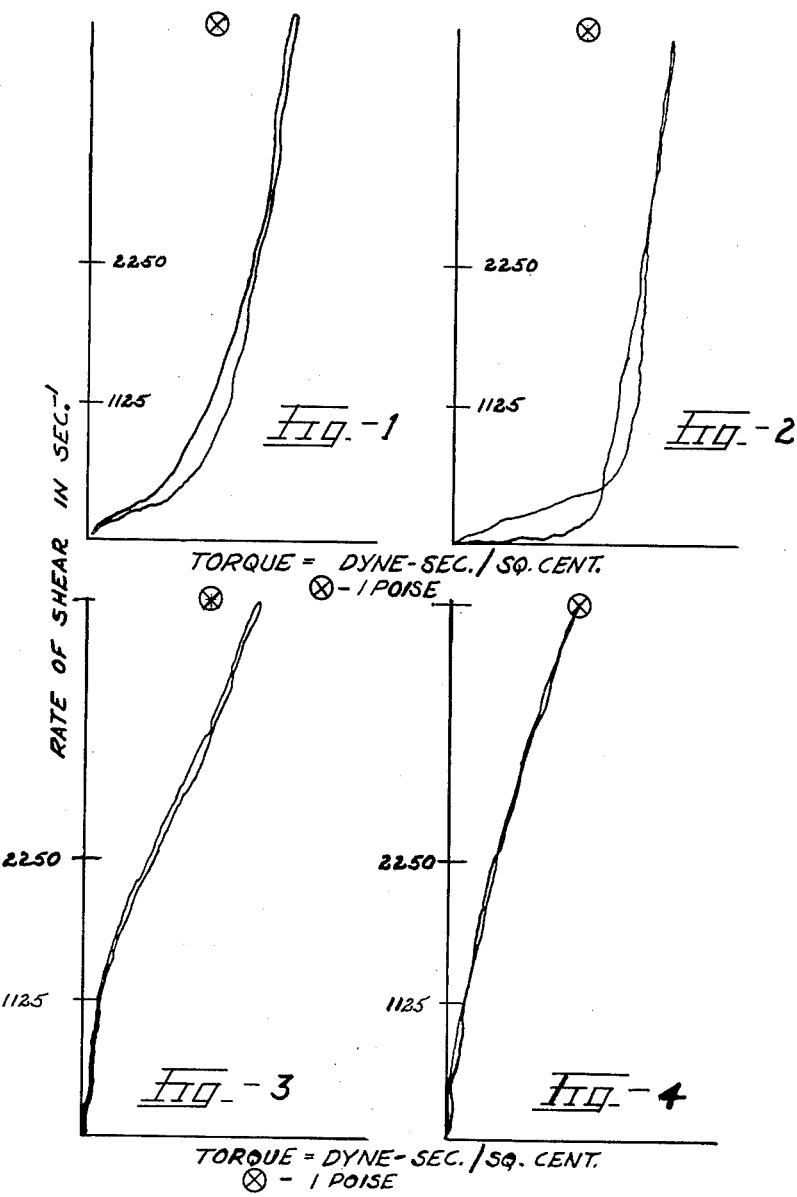
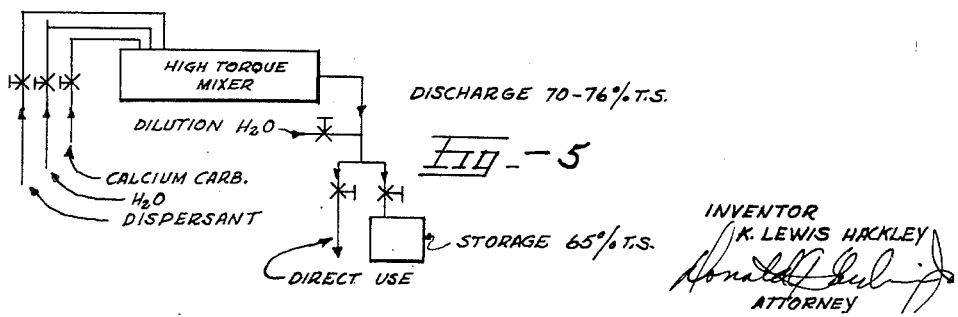
INVENTOR
K. LEWIS HACKLEY
ATTORNEY

United States Patent Office 3,029,153
Patented Apr. 10, 1962

3,029,153
METHOD OF TREATING CALCIUM CARBONATE
Kenneth Lewis Hackley, Hanover Township, Butler County, Ohio, assignor to Champion Papers Inc., a corporation of Ohio
Filed Mar. 4, 1959, Ser. No. 797,228
17 Claims. (Cl. 106—308)

This invention is concerned with the treatment of pigments. More particularly, the invention is concerned with a method of treating calcium carbonate to change its characteristics such as to significantly reduce its adhesive demand when used as a coating, its oil absorptive characteristics when used in paints, enamels, etc., and to produce calcium carbonate slurries of high total solids yet low viscosity.

The utility of calcium carbonate in coatings, putties, paints and plastics as a filler, coating or opacifying agent is well known. It is also known that various processes have been developed and used to prepare calcium carbonate for consumption by these various industrial applications.

In describing the invention hereinafter disclosed, reference will be made to coatings, particularly coatings for paper. The invention is not limited to such application, however, but the products produced have general utility wherever calcium carbonate is used. Since its use in coatings for paper emphasize above all other uses the difficulties that have been overcome and the practical worth of the invention, it is believed advantageous to describe it in terms of utility in the paper industry.

The use of calcium carbonate as a coating for producing fine printing papers is well known. Usually such coatings are comprised of calcium carbonate and a suitable adhesive, such as casein, which bonds the coating to the paper substrate. Though such coatings are excellent for producing such fine, high opacity printing papers, the use of calcium carbonate has not been as extensive as it might, due to the fact that the adhesive demand of calcium carbonate, as previously used, is excessive. This is a marked disadvantage due to the expensiveness of adhesives, often more costly to use than the calcium carbonate itself. Alternatively, if adhesive demand is to be reduced the calcium carbonate requires extensive processing prior to its application as a coating material. This extra processing, while reducing adhesive demand of the calcium carbonate, nonetheless does not permit of extensive use of the product because the mere act of performing extra processing steps increases cost; the various processes are not adapted to continuous operations; and in all cases, the processes require additional equipment all of which is primarily of the batch type. An example of the prior practices is a process of preparing calcium carbonate which consists of grinding the calcium carbonate in one of several devices, such as sigma mixers, ball mills, impact mills or the like, and thereafter passing the ground material through an inkmill or the like, to break up agglomerates which are formed during the initial grinding operations or by screening out a wasteful quantity of the agglomerates.

By so processing the material the particle size thereof is reduced, and adhesive demand is also reduced. Thereafter aqueous solutions of the treated calcium carbonate are formed for use in a coating operation. These grinding operations are a batch type operation and it is necessary to use a large or inordinate number of grinders, ink mills and the like to meet the daily demand of a single run of carbonate coated paper. These facts have discouraged the use of calcium carbonate or at least limited its use to very select applications where the quality of the finished product has to be such as to warrant its use and where premium prices can be obtained for the coated paper to enable use of the material on a profitable basis.

Recently it has become apparent that it is of the utmost importance that a process be discovered which would produce calcium carbonate of the desired particle size in a continuous process as an aqueous slurry which can be stored, pumped and handled in a manner similar to any fluid so that the calcium carbonate can be processed economically, quickly and easily for use as a coating, while requiring a minimum amount of the relatively expensive adhesives to hold the coating on the paper or the like. The critical nature of the problem is emphasized by its use in the paper industry where the use of high solids coating mixtures is essential to permit of adequate coating speeds, and where it is essential that the products of the sought after process be in the form of storable and stable high solids, aqueous slurry, exhibiting all of the advantages of the usual calcium carbonate when made into coatings.

The present invention deals with such a process and accordingly has for its object to develop a process for treating calcium carbonate to produce a suitable pigment at a reasonable cost and with a minimum of equipment, handling, etc.

A further object of the invention is to produce calcium carbonate having an advantageous particle size distribution.

An additional object of the invention is to produce a high solids, low viscosity aqueous slurry or dispersion of calcium carbonate which is extremely stable for long periods of time.

Still a further object of the invention is to produce a calcium carbonate product which may be economically used in coatings, as a filler, as an opacifying agent, and in a variety of ways in industry and at a reasonable cost.

A further object is to produce high solids, low viscosity calcium carbonate slurries in a continuous operation.

These and other objects of the invention not specifically referred to but inherent therein may be accomplished by supplying calcium carbonate having a relatively low moisture content, introducing a dispersing agent to produce a very dilatant, high total solids mixture, and thereafter subjecting the mixture produced to mechanical working in the form of compressive forces to cause a readily apparent "break" in viscosity of the mass. Subsequently, additional water may be added to produce a given slurry having the desired total solids, after which the slurry may be pumped as a fluid and stored for indefinite periods of time for use as required.

The "break" in viscosity of the mixture at high total solids is a phenomenon which is not completely understood. It can only be surmised that the "break" occurs because the work performed on very high solids, dilatant, aqueous calcium carbonate mixtures causes a breakdown in the particle size of the calcium carbonate and results in a close approach to the most desirable particle size distribution.

In any event the phenomenon is quite apparent upon visual inspection during performance of the process. For example, on a laboratory scale it may be seen that upon starting, the material including calcium carbonate, water and a dispersing agent has the appearance of a dry mass of powder and lumpy agglomerates. As working of the mass is continued it gradually takes on a wet appearance and then there is a sudden change in physical appearance as the viscosity of the material suddenly drops and the mixture becomes a true fluid, as distinguished from a pasty mass as is the case with the usual high solids slurries.

It is believed that as the working progresses, the mass more and more closely approaches a highly dilatant condition. The compression forces produced during mixing cause the material to go into a solid phase wherein the agglomerates and coarse particles are crushed or broken after which, when the compression is released, the material returns to the fluid phase and exhibits much less viscosity than that which it exhibited prior to the application of work or compression to the dilatant mass. This indicates that the ultimate in dilatancy and breakdown of the particles occurs almost simultaneously and can be made to occur continuously in a suitable process for continuously working the carbonate in the presence of proper proportions of the various ingredients.

The teachings of the prior processes, insofar as the working of dilatant high solids slurries is concerned, is to the effect that it is necessary to use inorganic dispersants to arrive at the necessary dilatancy to obtain the viscosity "break" and thus effect the production of high total solids, low viscosity coating mixtures, and that of the inorganic dispersing agents, inorganic polyphosphates are the most effective dispersants that would produce the desired dilatancy with the noted phenomenon under shear. Accordingly, all efforts to develop a continuous, economical process for treating calcium carbonate to obtain the desired advantages results have been apparently along this line of endeavor. To date no such process has materialized until the discovery of the process described hereinafter, because the inorganic dispersing agents, usually polyphosphates, used would not produce a slurry which is stable and which will store for indefinite periods of time without a marked increase in viscosity.

In the practice of the invention it has been discovered that certain organic dispersants not only will produce the required dilatancy in aqueous calcium carbonate solutions at high total solids wherein the so-called "viscosity break" can be made to occur, but the resultant high solids slurry is a low viscosity, extremely stable product which meets all of the requirements necessary to a fully commercial, continuous operation. As a result of this discovery it is now possible to continuously process calcium carbonate and not only achieve the desired results of low adhesive demand, low oil absorbency, etc., but to do so with a minimum of equipment, and even more significant, the resultant product exhibits all of the desired characteristics and remains stable, permitting of storage for use as desired.

It must be noted that the maximum advantages to be derived from practice of the invention, such as low adhesive demand, low oil absorbency, are realized when the so-called viscosity "break" is at a maximum. In other words, the best results are obtained where the dilatancy of the dispersed mixture actually is such that there is a pronounced transition from the solid phase to a liquid phase under the influence of externally applied forces. Thus, the mere fact that a given mixture may be dilatant to some extent does not necessarily mean that the desired results are obtained. In achieving the desired results, then, the degree of dilatancy is of particular significance, and every effort must be made to control the process to obtain the so-called viscosity "break" wherein the slurry passes through the transition stage from solid or granulate phase to the fluid phase as is illustrated by the examples.

The effect of the process can best be realized when consideration is given to the rheograms shown in the attached drawings wherein FIG. 1 is a rheogram of the characteristics of a calcium carbonate water mixture before being subjected to any of the steps of the method defined herein, FIG. 2 is a rheogram similar to FIG. 1 but after the calcium carbonate has been worked without any dispersant, FIG. 3 is a rheogram of a mixture with dispersant added, but not worked, FIG. 4 is a rheogram showing the rheological characteristics of a calcium carbonate which has been adequately dispersed and subjected to mechanical working, and is believed to clearly indicate the advantages of subjecting a high total solids slurry, properly dispersed, to mechanical working, and FIG. 5 is a schematic view of the manner in which the invention can be practiced as a continuous process.

All of the above identified rheograms (as well as all of the viscosity values given herein) were obtained by measuring the viscosity of each sample under the same conditions with a Hercules Hi-Shear Viscometer, in accordance with standard rheological practices, employing the "A" bob, and at room temperature at 4540 sec.$^{-1}$.

It is believed that the rheograms illustrate quite clearly that a coating slurry having a viscosity of 1 poise or less can be made at greater than 65% total solids. In fact, suitable slurries have been made at as high as 72% total solids. A comparison of the diagrams of FIGS. 1, 2 and 3 will clearly indicate the effect on viscosity of a slurry which has been dispersed according to the invention. Note that in FIGS. 1, 2 and 3 the rheograms are at 43% to 49% total solids, while a 1 poise viscosity of a 72% slurry made according to the invention is a vastly different result as shown in FIG. 4.

It has been found that a proper dispersion of calcium carbonate to effect the invention can be obtained by subjecting the calcium carbonate water mixture to mechanical working, preferably working of the type associated with high shearing force, in the presence of an organic acid having at least one functional group other than the carboxyl group and a source of a base ion as is obtained from sodium fluoride, sodium hydroxide, diethanolamine, and the like. Generally it has been found that a slight excess of acid is not harmful but rather, it enhances the results.

An equivalent result may also be obtained in the presence of a dispersing agent comprised of a salt of an organic acid having at least one functional group aside from the carboxyl group and preferably in the presence of a slight excess of the acid from which the salt is formed.

Organic acids or salts thereof which are suitable for carrying out the process are those organic acids having at least one other functional group in close proximity to the carboxyl group. The additional functional group is defined as another carboxyl group, a hydroxyl group, or a neutral group containing an atom with one or more pairs of free electrons, e.g., an ether, a keto, an amino group or the like, both the initial carboxyl group and additional functional group being attached to the same or adjacent carbon atoms.

Calcium carbonate slurries so treated have exceptionally desirable properties as a coating material, having a viscosity of about 1 poise or less at a total solids of over 70% as seen in FIG. 4, and a viscosity of less than 1 poise at lower total solids; are readily pumpable; and are exceptionally stable, being readily stored for periods of at least three weeks. Thus, slurries can be made in any suitable apparatus capable of subjecting slurries dispersed in accordance with the invention to a high-shear load, such as an overlapping arm mixer, and then may be stored for use as desired, being subsequently mixed with a suitable adhesive to form a coating. In addition, such slurries exhibit other desirable properties of which the most important is a considerably lowered adhesive demand when the slurry is made into coatings and, further, the agglomerates therein are reduced to such an extent that no further processing, such as screening or ink milling, of the slurry is required.

Specific examples of the manner of practicing the invention are as follows:

*Example 1.*—Five hundred grams of calcium carbonate and sufficient water were made to produce a mixture at 75% total solids. To this mixture was added 2.0 grams of sodium fluoride and thereafter 3.5 grams of citric acid dissolved in 16.5 cc. of water. This mixture at 73% total solids (having the appearance of a granular mass) was then subjected to working in a laboratory type mixer until the transition from the solid phase to a liquid phase was seen to take place, forming a fluid slurry. After this transition the slurry was reduced to 65% total solids by the addition of water. The viscosity measured 1.0 poise at 4540 sec.$^{-1}$.

*Example 2.*—Five hundred grams of calcium carbonate were commingled with enough water to produce a mixture of 78% total solids. To this mixture was added 2.0 grams of sodium hydroxide and 5.0 grams of diglycolic acid in a small amount of water; the total solids of the mixture was in the range of 75%–76% at the commencement of mechanical working. The transition from solid to liquid phase was observed. Thereafter enough water was added to produce a slurry at 65% total solids. At this point the viscosity of the slurry measured 0.8 poise at 4540 sec.$^{-1}$.

*Example 3.*—Five hundred grams of calcium carbonate were commingled with 2 grams of sodium hydroxide and 4 grams of hemimellitic acid dissolved in a small amount of water. The resultant mixture at 76% total solids was then subjected to mechanical working. After the transition from the apparently solid phase to the fluid phase sufficient water was added to bring the total solids of the fluid down to 67%. The viscosity at this percentage, was 0.51 poise.

*Example 4.*—Five hundred grams of calcium carbonate and enough water were commingled with 3 grams dry weight of pyruvic acid and 1.75 grams dry weight of sodium hydroxide to form an apparently dry mass at 76% total solids. This dry appearing, powdery lumpy mass was subjected to mechanical working in a laboratory mixer at 76% total solids. Upon working, there was a visible change in the appearance of the mass from the dry appearance to a creamy appearing fluid. Then additional water was added to bring the total solids down to about 65%. This slurry had a viscosity of 0.3 poise.

In order to appreciate the results obtained a comparison of the untreated calcium carbonate slurry was attempted at 65%. It was totally impossible to obtain a rheogram of a slurry at 65% total solids on the Hercules Viscometer and it was not until sufficient water was added to reduce the total solids to 55% that the viscosity was determined at 2.0 poise at 4540 sec.$^{-1}$. A slurry for coating at 55% solids contains too much water, for economical coating at high speeds and, additionally, the adhesive demand of the calcium carbonate is excessive.

Of significant importance is the fact that in all of the above examples the final slurry exhibited a definite stability with little or no tendency to increase in viscosity when stored for periods up to three weeks or more.

While the process can be carried out on a batch basis and the above examples are of that type, the present invention enables realization of an economical and continuous process of treating calcium carbonate. The practice of a continuous process can be carried in a suitable mixing apparatus, into which calcium carbonate, a carboxylic acid of the type described, water and a source of basic ion in the correct proportions are continuously fed and worked at greater than 65% total solids, and thereafter, before the slurry is discharged, sufficient additional water can be added to reduce the solids content to a predetermined desired percentage, say about 65%. Thereafter by pumps and pipelines the slurry may be conveyed to storage tanks from which it may be drawn on demand. This process is illustrated in FIG. 5.

The following are examples of the manner in which the invention may be practiced as a continuous process according to the illustration of FIG. 5.

*Example 5.*—Calcium carbonate, water, and a dispersing agent were metered into a continuously operating mixer capable of performing work thereon. The calcium carbonate was fed into the mixer at a rate of 1.67 pounds per minute dry weight. The dispersing agent, sodium citrate, was fed into the mixer at the rate of 0.0165 pound per minute dry weight (in the form of a 12% aqueous solution) and water was introduced at the rate of 0.13 pound per minute to bring the total solids of the mixture entering the mixer to 71%. The material at the same total solids discharged from the mixer in the form of a fluid. Dilution water was added to bring the total solids to about 68.5%. This slurry was readily flowable, easily pumpable, and had a viscosity of 0.63 poise; it was highly stable showing substantially no change in viscosity after storage for three weeks. It will be noted that in this example the dispersant comprised a salt of an organic acid of the type defined hereinabove.

*Example 6.*—Utilizing the same equipment as described in Example 4 and as illustrated in FIG. 5, calcium carbonate was fed into the mixer along with the dispersant, citric acid, and a source of basic ion, sodium fluoride, at the following rate: calcium carbonate at 1.67 pounds per minute, dry weight; citric acid at 5.3 grams per minute dry weight (in the form of a 28% aqueous solution); and sodium fluoride at the rate of 3.04 grams per minute, dry weight. The rate of water added was such as to hold the mixture at about 75% total solids as it entered the mixer and was run continuously therethrough. At the exit end of the mixer the calcium carbonate discharged as a fluid, still at about 75% total solids. Dilution water was added to cut the total solids to 65% and the viscosity of the slurry was 0.24 poise.

A sample of the same calcium carbonate made up into an aqueous slurry and no dispersing agent was checked for viscosity without working as described above. A satisfactory rheogram could not be obtained nor could the viscosity be ascertained until the total solids of the slurry was reduced to 50%. At 50% total solids, the viscosity of the unworked calcium carbonate was measured as 3.5 poise.

As was stated earlier, one of the desired results that is obtained by a practice of the present invention is a reduction in adhesive demand of the treated product, when, for example, the calcium carbonate slurries are formed into coatings for paper. It has been found that the adhesive required to form a satisfactory coating may be reduced 15% to 20% from that required to form an adequate coating with untreated calcium carbonate, assuming all other conditions are equal. This 15% to 20% reduction in adhesive demand compares very favorably with the reduced demand obtained by the treatment of calcium carbonate in the prior art and is quite indicative of the fact that the novel process herein described not only produces a satisfactory product, but also may be practiced as a continuous process, as distinguished from all of the operations.

Calcium carbonate slurries having a viscosity above 2 poises are not practical to handle; they are so heavy that they cannot be pumped or circulated for processing or use, such as in making up paper coatings. The calcium carbonate slurries prepared according to my process, although in a quite high solids range (65% to 68% total solids) will have a viscosity of 1 poise or less and excellent flow properties, permitting easy pumping. The paper coatings, prepared from carbonate slurries produced by my invention, have improved flow properties at higher solids.

The amount of dispersing agent employed will depend upon the characteristics of the calcium carbonate to be processed. In general, from 0.1% to 3.0% of organic acid based upon the dry weight of the calcium carbonate is employed.

Having described the invention method, it will be apparent that modifications and changes will occur to those skilled in the art, all of which fall within the spirit and scope of the inventive concept which is limited only as defined in the claims, wherein what is claimed is:

1. A method of preparing aqueous calcium carbonate dispersions having improved coating properties which comprises forming a solid powdery composition of calcium carbonate, a dispersing agent selected from the group consisting of (1) a mixture of an organic carboxylic acid having in addition to the carboxyl group at least one functional group attached to a carbon atom which is selected from the group consisting of (a) the carbon atom to which the carboxyl group is attached and (b) a carbon atom which is adjacent to the carbon atom to which the carboxyl group is attached, and a basic compound which is capable of forming a salt with said carboxylic acid and (2) salts of said carboxylic acid and said basic compound, and sufficient water to produce a mixture of no less than about 65% by weight total solids, and mechanically working the composition until the said mixture passes from a solid powdery phase to a fluid phase having a viscosity of not in excess of about 1 poise as measured at 65% total solids using a Hercules Hi-Shear Viscometer at room temperature at 4540 seconds$^{-1}$.

2. A method as defined in claim 1 wherein sufficient water is employed in the solid powdery composition to produce a mixture of no less than about 71% by weight total solids.

3. A method as defined in claim 1 wherein sufficient water is employed in the solid powdery composition to produce a mixture having a total solids content of about 71% to 76% by weight.

4. A method as defined in claim 1 wherein the additional functional group contained in the said carboxylic acid is selected from the group consisting of carboxyl groups, hydroxyl groups, ether groups, keto groups and amino groups.

5. The method of claim 1 wherein the dispersing agent contains from 0.1% to 3.0% by weight of the said organic carboxylic acid based on the dry weight of the calcium carbonate employed.

6. The method of claim 1 wherein the basic compound employed is selected from the group consisting of alkaline sodium compounds and diethanolamine.

7. The method of claim 1 wherein the carboxylic acid is citric acid.

8. The method of claim 1 wherein the carboxylic acid is diglycolic acid.

9. The method of claim 1 in which the carboxylic acid is hemimellitic acid.

10. The method of claim 1 in which the carboxylic acid is pyruvic acid.

11. The method of claim 1 which is conducted in a continuous manner.

12. An aqueous calcium carbonate dispersion having a viscosity of no greater than 1 poise as measured using a Hercules Hi-Shear Viscometer at room temperature at 4540 seconds$^{-1}$ and having a total solids content of at least about 65% and containing a dispersing agent selected from the group consisting of (1) a mixture of an organic carboxylic acid having in addition to the carboxyl group at least one functional group attached to a carbon atom which is selected from the group consisting of (a) the carbon atom to which the carboxyl group is attached and (b) a carbon atom which is adjacent to the carbon atom to which the carboxyl group is attached, with a basic compound which is capable of forming a salt with said carboxylic acid, and (2) salts of said carboxylic acid and said basic compound, the said carboxylic acid being present in an amount from about 0.1% to 3.0% by weight based on the dry weight of the calcium carbonate.

13. The aqueous calcium carbonate dispersion of claim 12 in which the carboxylic acid is citric acid.

14. The aqueous calcium carbonate dispersion of claim 12 in which the carboxylic acid is diglycolic acid.

15. The aqueous calcium carbonate dispersion of claim 12 in which the carboxylic acid is hemimellitic acid.

16. The aqueous calcium carbonate dispersion of claim 12 in which the carboxylic acid is pyruvic acid.

17. The method of claim 1 wherein said mechanical working is performed with a high shearing force.

References Cited in the file of this patent

UNITED STATES PATENTS

| | | |
|---|---|---|
| 1,864,152 | Simms et al. | June 21, 1932 |
| 2,232,164 | Carter | Feb. 18, 1941 |
| 2,233,358 | Nutting | Feb. 25, 1941 |
| 2,346,243 | Wilson | Apr. 11, 1944 |
| 2,385,379 | Rafton | Sept. 25, 1945 |
| 2,830,914 | McDonald | Apr. 15, 1958 |
| 2,927,862 | Welch | Mar. 8, 1960 |

FOREIGN PATENTS

| | | |
|---|---|---|
| 549,332 | Great Britain | Nov. 17, 1942 |